March 22, 1966  D. W. MOLINS  3,241,288
APPARATUS FOR ENCLOSING QUANTITIES OF PARTICULATE MATERIAL
Filed April 30, 1963
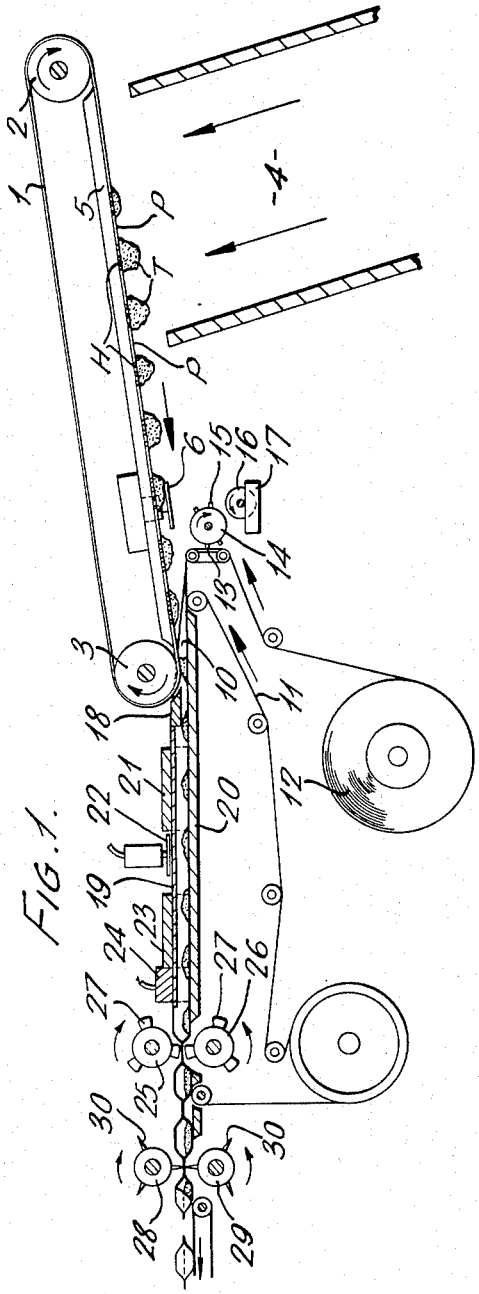
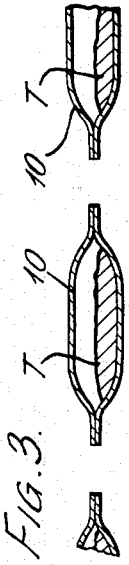
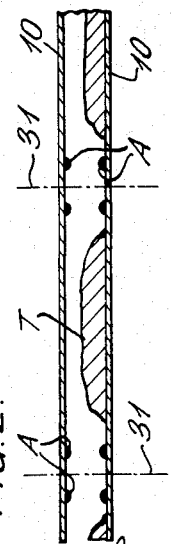
INVENTOR
Desmond W. Molins
By Watson, Cole, Grindle & Watson
ATTORNEYS

United States Patent Office

3,241,288
Patented Mar. 22, 1966

3,241,288
APPARATUS FOR ENCLOSING QUANTITIES OF PARTICULATE MATERIAL
Desmond Walter Molins, Deptford, London, England, assignor to The Molins Organisation Limited
Filed Apr. 30, 1963, Ser. No. 276,854
Claims priority, application Great Britain, May 2, 1962, 6,870/62
2 Claims. (Cl. 53—180)

This invention concerns improvements in or relating to apparatus for enclosing quantities of particulate material, such as tea, in containers, for example for producing small packets of tea, such as those often known as "tea bags," intended to contain the tea while it is being infused. Such bags are sometimes made of cloth and sometimes of a suitable type of paper which has sufficient wet strength to enable the bag to be immersed in boiling water without breaking and which is also sufficiently porous to enable the tea to be infused.

According to the present invention the apparatus includes a conveyor which at spaced intervals along its length has air-previous areas, suction means to apply suction through said areas, means to supply particulate material to the conveyor so that quantities are suctionally held to said air-pervious areas, means to transfer the said quantities on to a continuous web of wrapping material, means to form the web into a sealed tube about the said quantities, means to divide the tube into separate sections each containing one of the said quantities, and means to seal the ends of said sections.

In order to make the content of the said quantities more uniform, the material may initially be fed to the conveyor in excess of what is required, a trimming device being provided to remove surplus material and thereby reduce the said quantities to substantially uniform cross-sectional size.

Preferably the material is fed to the conveyor by an air stream, the air being drawn through the said air-pervious areas. The material may be held to and conveyed on the underside of the conveyor (for example it may be received on the underside of the conveyor, being impelled thereto by an upwardly-directed air stream) and the conveyor may extend over the said web of wrapping material so that the said quantities of material can be deposited on the web by cutting off the suction from the conveyor.

The general principle of the apparatus may be similar to that of the continuous rod cigarette-making apparatus disclosed in, for example, copending United States Serial No. 221,598 although in some respects the apparatus can be of a simpler nature than that just mentioned.

Apparatus in accordance with the invention will now be described by way of example, with general reference to the disclosure in the above-mentioned Serial No. 221,598, and to the accompanying drawings, in which:

FIGURE 1 diagrammatically shows a front view of apparatus for enclosing quantities of tea in packets or bags, FIGURE 2 represents, in cross-section a portion of a tube of wrapping material which has been formed to enclose the said quantities, and FIGURE 3 represents, in cross-section, bags produced from the tube illustrated in FIGURE 2.

In the apparatus disclosed in copending United States Serial No. 221,598 cut tobacco is fed into an enclosed passage 4 through wich a high-speed air current is directed upwardly towards and through an air-pervious conveyor 1, so as to impel the tobacco particles to the conveyor on whose underside they are suctionally held and form a tobacco stream. The tobacco is supplied in excess, and surplus is removed from the stream by a trimming device 9 which reduces the stream to a required cross-sectional size. The trimmed stream is then transferred on to a paper web 10 running beneath the conveyor 1, the paper web is folded and sealed around the tobacco, and the continuous rod thus formed is severed at suitable intervals to produce cigarettes.

In the above-mentioned disclosure, the suction conveyor band 1 is provided at intervals with groups of suction holes arranged differently from those at other parts of the band.

The apparatus according to the present invention is, as stated above, broadly similar in principle to that just referred to. The conveyor band 1 in the present case, however, is provided with lengthwise spaced groups of holes H, FIGURE 1, instead of being perforated along its whole length, and these groups are separated from each other by plain areas P. The band 1 passes about guide wheels 2 and 3 one of which drives the band.

Tea is projected upwardly towards the conveyor band 1 by means of an upwardly directed current of air which flows through a passage 4 as indicated in FIGURE 1, and passes through the holes H in the band, a suction chamber 5 being provided behind the band. If desired, a proportion of the air may be drawn from the passage through an outlet grille such as that shown at 8 in the drawings of the above-mentioned application. The tea is attracted to the groups H of suction holes or perforated areas of the band, but does not settle on the intermediate plain areas P. As a result, separate quantities of tea are suctionally held and carried forward by the conveyor band 1 as shown diagrammatically in FIGURE 1 of the accompanying drawings. These quantities are indicated by the reference T.

A trimming device, which may be similar to that disclosed in the above mentioned application, and which includes trimming discs 6, operates to reduce these quantities of tea to a required depth by removing surplus tea which extends below the level of the discs 6.

The conveyor band 1 extends partly over a paper web 10 which is guided over and conveyed by a tape 11. The conveyor band 1 approaches the paper web 10 sufficiently closely to enable the quantities of tea to be transferred to the paper without any material drop, so that they are spaced correctly apart along the paper web.

The paper web may consist of any suitable known type of paper which is known and used in the manufacture of paper tea bags and is fed from a reel 12 over a guide 13. A rotating roller 14, provided with ribs 15, acts to apply a suitable adhesive to the web in strips A, FIGURE 2, extending across the width of the web and spaced apart so as to be located between those parts of the paper web which will receive quantities of tea. The ribs 15 receive adhesive from a roller 16 which rotates in an adhesive bath 17.

A shoe 18 just beyond the wheel 3 lightly touches the band 1 and ensures that no tea is carried around the wheel. Immediately beyond the shoe 18 is a long, semitubular element 19 which extends lengthwise over the paper web 10. The tape 11 runs through a trough 20 which forms the tape 11 and the paper web 10 into U cross-section in the manner well-known in continuous rod cigarette-making machines. A first folder 21 folds one side of the paper web down on to the element 19, leaving the other side of the web standing upright to receive a continuous strip of adhesive from an adhesive-applying disc 22. A second folder 23 folds the gummed side of the paper web down so that it overlaps and is pressed against the first folded edge, and the seam so formed is subjected to heat by a heater 24. In this way the web is formed into a tube enclosing the spaced quantities T of tea. A section of this tube is shown in FIGURE 2.

A pair of rotating rollers 25, 26 positioned above and below the sealed paper tube are provided with presser segments 27 which cooperate to grip the paper tube at the positions where the strips of adhesive A have been applied, and to press these portions of the tube flat so as to close and seal them.

A further pair of rotating rollers 28, 29 carry knife blades 30 which cooperate to cut the tube at its flattened portions, the rollers being so timed that the opposed blades cut the paper midway between two strips of adhesive. The positions where the paper is cut are indicated by dot and dash lines 31. As can be seen from FIGURE 1, this cutting operation divides the tube into a succession of sealed bags or packets each containing a quantity of tea.

Immediately after the cutting operation these bags pass on to a conveyor 32, FIGURE 1, which is arranged to move a little faster than the uncut paper web, in order to space the bags apart from each other, as illustrated in FIGURE 1 and to a larger scale in FIGURE 3. The bags are then dealt with in any suitable and convenient way. For example they may be deflected sideways on to a catcher band in the same way that cigarettes cut from a continuous cigarette rod are deflected.

As an alternative to forming the seam by adhesive, the seam may be formed by crimping in a manner known in connection with continuous rod cigarette-making machinery.

It will be seen that by means of apparatus such as has been described it is possible to produce "tea bags" or small containers or packages of any suitable material by operating on the continuous rod principle, which enables a high rate of production to be achieved in a simple and economical way.

The means by which the tea or other material is fed into the passage through which it is impelled by air on to the conveyor band 1, can be considerably simpler than the corresponding means for feeding tobacco in the cigarette-making machine referred to. For example the tea may be fed from a simple hopper by means of a fluted drum which deposits it on a vibrating conveyor plate arranged to feed the tea directly into the passage. The vibrating conveyor plate is effective not only to spread the tea evenly but also to even out any lumps or other accumulations.

What I claim as my invention and desire to secure by Letters Patent is:

1. Apparatus for enclosing quantities of particulate material, such as tea, in containers, the said apparatus including a conveyor having air-pervious areas at spaced intervals along its length alternating with air-impervious areas, suction means to draw air through said air-pervious areas, means to direct an air stream towards said conveyor and through said air-pervious areas, feed means to continuously feed particulate material into said air stream for conveyance thereby to said air-pervious areas to which quantities of said material are suctionally held in spaced relationship, said feed means being arranged to feed more material than is required, means to separate and remove surplus material from the spaced quantities of material held by suction to said air-pervious areas, and thereby reduce said quantities to substantially uniform size, means to transfer said spaced quantities on to a continuous web of wrapping material, means to form the web into a sealed tube about said quantities, means to seal the tube transversely of its length between the said quantities, and means to divide the tube into separate sealed sections each containing one of said quantities.

2. Apparatus as claimed in claim 1, wherein the said air stream is directed upwardly towards the conveyor so as to impel the material on to the underside of the conveyor, and wherein the conveyor extends over the said web of wrapping material so that the said quantities of material can be deposited on the web by cutting off the suction from the conveyor.

References Cited by the Examiner
UNITED STATES PATENTS

| 1,808,794 | 6/1931 | Stelzer | 131—21 |
| 2,555,758 | 6/1951 | Nobel et al. | 53—180 |
| 2,635,301 | 4/1953 | Schubert et al. | 131—84 |
| 3,019,793 | 2/1962 | Labbe | 131—84 |

FOREIGN PATENTS

| 624,595 | 7/1961 | Canada. |

FRANK E. BAILEY, *Primary Examiner.*

S. ABEND, *Examiner.*